United States Patent [19]

Kult et al.

[11] Patent Number: 5,066,098

[45] Date of Patent: Nov. 19, 1991

[54] CELLULAR ENCAPSULATED-LENS HIGH WHITENESS RETROREFLECTIVE SHEETING WITH FLEXIBLE COVER SHEET

[75] Inventors: Roger R. Kult, Maplewood; Terry R. Bailey; Howard R. Tolliver, both of Woodbury, all of Minn.

[73] Assignee: Minnesota Mining and Manufacturing Company, St. Paul, Minn.

[21] Appl. No.: 657,874

[22] Filed: Feb. 19, 1991

Related U.S. Application Data

[63] Continuation of Ser. No. 532,175, Jun. 4, 1990, abandoned, which is a continuation of Ser. No. 423,514, Oct. 13, 1989, abandoned, which is a continuation of Ser. No. 50,620, May 15, 1987, abandoned.

[51] Int. Cl.$^5$ .............................................. G02B 5/128
[52] U.S. Cl. ..................................... 359/540; 359/534
[58] Field of Search .......................... 350/102, 104, 105

[56] References Cited

U.S. PATENT DOCUMENTS

| | | | |
|---|---|---|---|
| 2,407,680 | 3/1945 | Palmquist et al. | 88/82 |
| 2,948,191 | 8/1960 | Hodgson et al. | 88/82 |
| 3,190,178 | 6/1961 | McKenzie | 88/82 |
| 3,935,359 | 1/1976 | Rowland | 350/103 |
| 4,025,159 | 5/1977 | McGrath | 350/105 |
| 4,618,518 | 10/1986 | Pricone et al. | 350/105 |
| 4,637,950 | 1/1987 | Bergeson et al. | 350/105 |
| 4,663,213 | 5/1987 | Bailey et al. | 428/204 |
| 4,664,966 | 5/1987 | Bailey et al. | 428/203 |
| 4,896,943 | 1/1990 | Tolliver et al. | 350/105 |

Primary Examiner—Bruce Y. Arnold
Assistant Examiner—David R. Parsons
Attorney, Agent, or Firm—Gary L. Griswold; Walter N. Kirn; Robert H. Jordan

[57] ABSTRACT

Cellular, encapsulated-lens retroreflective sheeting comprising: (1) a base sheet of a monolayer of retroreflective elements partially embedded in a binder layer which typically is white or comprises a whitening agent; (2) a cover sheet disposed in spaced relation from the layer of retroreflective elements; and (3) a network of narrow intersecting bonds or seal legs that extend between the cover sheet and the base sheet and comprise binder material thermoformed at the point of contact between the base sheet and cover sheet so as to adhere the base sheet and the cover sheet together and form a plurality of cells within which retroreflective elements are hermetically sealed; wherein the cover sheet comprises an inner layer and at least a structural layer, the structural layer being adhered to the outside surface of the inner layer. The inner layer of the cover sheet has a higher Vicat Softening Point and/or lower adhesion to the microlenses than at least the structural layer of the cover sheet so that when the cover sheet and base sheet are sealed together and the binder material is thermoformed into contact with the cover sheet to form the seal legs, the binder material is better able to flow around and flood the front surfaces of the retroreflective lenses, thereby hiding same and imparting greater whiteness to the resultant sheeting.

29 Claims, 1 Drawing Sheet

CELLULAR ENCAPSULATED-LENS HIGH WHITENESS RETROREFLECTIVE SHEETING WITH FLEXIBLE COVER SHEET

This is a continuation of application Ser. No. 07/532,175, filed June 4, 1990, now abandoned, which is a continuation of application Ser. No. 07/423,514 filed Oct. 13, 1989, now abandoned, which is a continuation of application Ser. No. 07/050,620 filed May 15, 1987, now abandoned.

FIELD OF INVENTION

This invention concerns cellular, or encapsulated-lens, retroreflective sheeting comprising a binder layer in which a monolayer of retroreflective elements is partially embedded and a cover sheet sealed to the binder layer such that the reflective elements are encapsulated within hermetically sealed cells. The invention particularly concerns such encapsulated-lens sheeting comprising a softer, more flexible cover sheet than is currently used in some retroreflective sheetings.

BACKGROUND

The earliest retroreflective sheeting had an exposed lens construction, but reflex-reflection of light was inhibited when the lenticular surfaces of the lenses were covered with water. This problem was answered by enclosed-lens retroreflective sheeting in which, as first taught in U.S. Pat. No. 2,407,680 (Palmquist et al.), the lenses were totally embedded within a sheeting that had a flat front surface provided by a flat transparent top film. This allowed incident light rays to be focused onto the specularly reflective layer irrespective of whether the front of the sheet was wet or dry.

U.S. Pat. No. 3,190,178 (McKenzie) solved the same problem in a different way, namely, by modifying retroreflective sheeting of the exposed-lens type wherein the lenses are partially embedded in a binder layer. In the McKenzie patent, the exposed lenses are protected by a cover film or sheet to which the binder layer is sealed along a network of interconnecting lines, thus forming a plurality of hermetically sealed cells within which the lenses are encapsulated and have an air interface. Such exposed-lens sheeting is sometimes referred to as "encapsulated-lens" or "cellular" retroreflective sheeting. U.S. Pat. No. 3,190,178 discloses a cellular retroreflective sheeting that is formed from (1) a base sheet comprising retroreflective elements partially embedded in a binder layer and (2) a cover sheet. The sheeting is formed by lamination of the base sheet and cover sheet together with heat and pressure to displace binder material from the binder layer into adherent contact with the cover sheet. The displacement is performed in a pattern to provide the desired network of interconnecting bonds that define the hermetically sealed cells. An advance upon this technique is disclosed in U.S. Pat. No. 4,025,159 (McGrath) wherein the binder material is taught to be a thermoformable material that is cured in situ after being thermoformed, thereby achieving more reliable adhesion of the binder material to the cover sheet.

The front portion of such retroreflective sheeting, on which light to be reflected is received, is made up of individual cells of retroreflecting elements, e.g., microspheres having an aluminum vapor coat on the rear surfaces thereof, separated by the pattern of interconnecting bonds that define them. The individual cells may be of any shape, but are typically of uniform, regular shape, e.g., squares or hexagons, to enable easier fabrication and to improve the appearance of the sheeting. Typical cells are on the order of 3 to 4 millimeters wide. The interconnecting bonds that define and separate the cells, sometimes referred to herein as "seal legs", are typically on the order of 0.5 millimeters wide. According to the aforementioned references, as the base sheet and cover sheet are laminated together the binder material swallows up or flows around the microspheres in the seal legs. While wider bonds may be desired to provide greater resistance to delamination, such measures will reduce the proportion of the total surface of the sheet which is retroreflective, thereby reducing the total brightness of the sheeting. Typically, the seal legs make up about 20 to 30 percent of the total surface area of the retroreflective sheeting with the remaining portion being made up by the cells of retroreflective elements.

It is often desired that retroreflective sheeting have a white appearance under ambient conditions. A white appearance is typically preferred for aesthetic reasons as well as for functional reasons, e.g., to provide an effective contrast between the indicia and background of a sign such as a speed limit sign. As indicated above, about 70 to 80 percent of the surface area of a typical retroreflective sheeting is made up of the cells containing several hundreds or thousands of vapor-coated microspheres. The microspheres are typically gray in appearance due to the aluminum vapor coat on the rear surfaces thereof. Whiteness of a sheeting may be improved be incorporating a whitening agent, e.g., a pigment such as titanium dioxide, in the binder layer or cushion coat of the base sheet such that the material that flows around the microspheres in the seal legs into contact with the cover sheet will have a white appearance. To a lesser extent, increasing the whiteness of the binder material in this fashion may also tend to increase the whiteness in appearance of the cells of the retroreflective sheeting wherein minute portions of the binder layer may be visible between individual microspheres. The major influence upon overall sheeting whiteness is, however, typically provided by the seal leg areas. The overall whiteness of retroreflective sheeting is commonly measured or expressed in terms of Cap Y which may be determined according to ASTM E97-77. For instance, U.S. Department of Transportation Federal Highway Administration Specification FP85 Section 718.01 Retroreflective Sheeting Materials provides that Type II retroreflective sheetings (i.e., encapsulated-lens retroreflective sheetings) have a CAP Y of at least 27.

In order to enhance the flexibility of retroreflective sheeting, it may be advantageous to use a cover sheet that comprises relatively more flexible materials than the first disclosed cover films which comprised such materials as polymethylmethacrylate. Such materials may also offer other advantages when used as cover films, e.g., improved impact resistance or greater impermeability to moisture. An example of such a cover film is one comprising ethylene/acrylic acid copolymer such as is disclosed in U.S. Pat. No. 4,896,943 (Tolliver et al.), which is commonly assigned herewith.

It has been found, however, that cover film materials that are relatively more flexible and exhibit thermoplastic characteristics, particularly during fabrication of retroreflective sheeting, may tend to soften at relatively lower temperatures than do relatively less flexible cover films. Thus, flexible cover films that are extrudable, i.e., are thermoplastic, rather than being solvent-cast, may be subject to softening to a significant degree during the lamination and sealing of the cover film to a base sheet comprising the retroreflective elements. For example, polyolefin-based cover films may be preferred because of the advantages, e.g., conformability, impact resistance, moisture impermeability, high flexibility, clarity, and strength, which they can impart to a cover film and retroreflective sheeting incorporating same. During a typical lamination process, the binder layer is heated to about 220° to 350° F. (105° to 195° C.) by a patterned pressure roll that forces the binder material, according to the pattern, into adherent contact with the inside surface of the cover film, which is in turn believed to be heated by the warmed binder layer to about 150° to 160° F. (65° to 70° C.), i.e., temperatures sufficiently warm to change the surface characteristics, e.g., degree of softness and/or tendency to adhere to such materials as glass microspheres, of some cover films. It has also been found, that when cellular retroreflective sheeting is formed by such lamination techniques as disclosed in the aforementioned McKenzie and McGrath patents, e.g., with heat and pressure, if the cover film comprises a material such as a polyolefin-based copolymer, e.g., ethylene/acrylic acid copolymer that tends to soften and/or adhere to the surface of the microspheres at the temperatures at which the thermoforming is performed, that the resultant sheeting may not be as white as might be desired, i.e., the Cap Y of the resultant sheeting is not high enough. In such sheetings it has been found that the seal legs tend to have a substantially gray appearance that is believed to be the result of the microspheres in the seal leg not being effectively swallowed up or flooded by the white binder material when the sheeting is laminated to force the binder material into adherent contact with the cover sheet. Thus the gray aluminum vapor coat on the rear surface of the microspheres retains visible and detracts from the overall whiteness of the resultant retroreflective sheeting.

SUMMARY OF THE INVENTION

The present invention provides a cellular or encapsulated-lens retroreflective sheeting comprising a flexible cover sheet and having high whiteness and an aesthetically appealing appearance. The sheeting of the invention is thus well-suited for such uses as signing materials, particularly for use in retroreflective signs where the combination of great flexibility and toughness as well as high whiteness is desired, e.g., traffic cones and license plates.

In brief summary, the invention provides a cellular retroreflective sheeting comprising: (1) a base sheet that comprises a monolayer of retroreflective elements, sometimes referred to herein as microlenses, partially embedded in a binder layer; (2) a cover sheet disposed in spaced relation from the layer of retroreflective elements, such that the front surfaces of the elements have air interfaces; and (3) a network of narrow intersecting bonds that extend between the cover sheet and the base sheet and comprise binder material thermoformed at the point of contact between the bonds and the cover sheet so as to adhere the base sheet and the cover sheet together and form a plurality of cells within which retroreflective elements are hermetically sealed;

wherein the cover sheet comprises an inner layer and at least one structural layer, the inner layer having an inside major surface that is in adherent contact with the intersecting bonds, and an outside major surface adhered to the structural layer of the cover sheet, and the inner layer of the cover sheet having a Vicat Softening Point that is higher than the Vicat Softening Point of at least the structural layer of the cover sheet, and higher than the minimum temperature at which the binder material was thermoformable into contact with the cover sheet. The Vicat Softening Point of a material may be determined according to ASTM D1525. Depending in part upon the conditions of the ultimate environment where the resultant retroreflective sheeting is to be employed, it is typically preferred that the Vicat Softening Point of the inner layer be at least 175° F. (80° C.), more preferred that it be at least 200° F. (95° C.), and most preferred that it be at least 250° F. (120° C.). Furthermore, it is preferred that under the conditions of lamination the inner layer exhibit at most a minimal tendency to adhere to the front surfaces of the microlenses, i.e., exhibiting less adhesion to the microlenses than the structural layer exhibits when pressed against the microlenses under similar heat and pressure, e.g., temperature of about 150° F. (65° C.) or more and a nip roll pressure of about 50 pounds/inch-width (43 kilograms/centimeter-width) or more. Relative adhesion of materials to retroreflective elements such as microspheres may be determined according to the "Microsphere Adhesion" test described below.

During lamination, i.e., sealing, of the cover sheet to the base sheet wherein heat and pressure are applied to force binder material into adherent contact with the cover sheet in the pattern of seal legs, the inner layer of the cover sheet substantially retains its hardness and substantially does not adhere to the front surfaces of the retroreflective elements, thereby enabling the binder material to be forced around the retroreflective elements in the seal areas more effectively than during lamination with a cover sheet comprising no such inner layer. Thus, the binder material flows more effectively so as to swallow up or flood the front surfaces of a substantial portion, and preferably all of, the retroreflective elements in the seal legs and flows into contact with the inside surface of the cover sheet to provide a whiter resultant sheeting.

BRIEF DESCRIPTION OF THE DRAWINGS

The invention will be further explained with reference to the drawing, wherein.

These figures, which are not to scale, are idealized and are intended to be merely illustrative and nonlimiting.

DETAILED DESCRIPTION OF INVENTION

Figure 1:
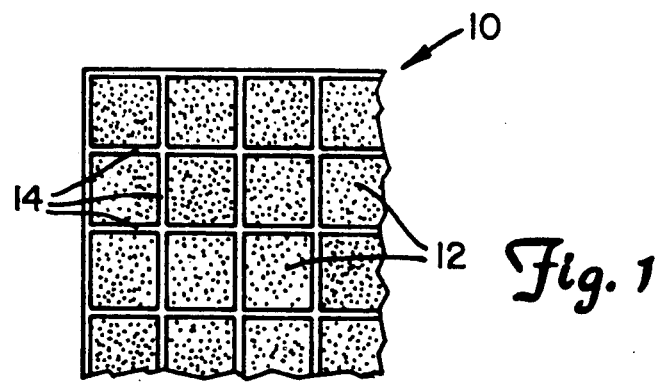
FIG. 1 is a top view of a portion of an embodiment of cellular retroreflective sheeting of the invention.

FIG. 1 is a top view of portion 10 of cellular or encapsulated-lens retroreflective sheeting of the invention having cells 12 that each comprise several hundreds or thousands of individual retroreflective elements. Narrow intersecting bonds or seal legs 14 separate cells 12, hermetically sealing same and bonding the cover sheet and base sheet together.

Figure 2:
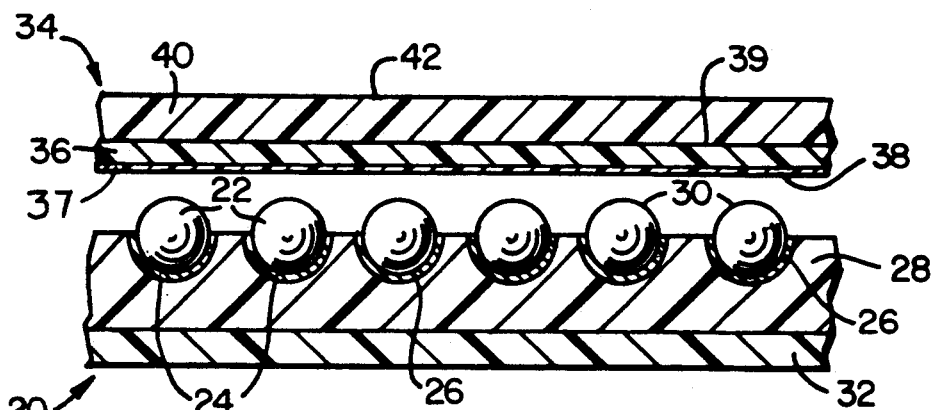
FIG. 2 is a cross-sectional representation of portions of a base sheet and cover sheet that may be laminated together to form a cellular retroreflective sheeting of the invention.

The retroreflective sheeting of the invention may be made by lamination of a cover sheet to a base sheet such as by the methods disclosed in the aforementioned McKenzie and McGrath patents. FIG. 2 illustrates portions of base sheet 20 and cover sheet 34 prior to such lamination.

Base sheet 20 comprises a monolayer of retroreflective elements, such as glass microspheres 22 that are approximately hemispherically coated with a specularly reflecting layer 24, e.g., vapor coated aluminum, on rear surfaces 26. Microspheres 22 are partially embedded in layer 28 of binder material such that front surfaces 30 of microspheres 22 are exposed and protrude from binder layer 28. Binder layer 28 is also sometimes referred to as a cushion coat. Retroreflective elements 22 are typically preferably packed closely together to provide a resultant sheeting having high retroreflection, but for clarity have been shown here in widely spaced fashion. Retroreflective elements 22 are preferably glass microspheres because such elements provide wide angle efficiency, i.e., high angularity, and are durable. Typical microspheres have diameters between about 40 and 200 microns, preferably an average of about 65 microns, and have an index of refraction of about 1.91. Base sheet 20 is shown on optional carrier 32 which is subsequently removed followed by application of a layer of adhesive (not shown) in place thereof.

The binder material serves to secure the retroreflective elements in the proper orientation and maintain their monolayer arrangement, and therefore preferably provides a strong bond to the individual retroreflective elements. The retroreflective elements are typically embedded sufficiently deeply in the binder material that they are securely anchored, yet not sufficiently deeply that the brightness or angularity of the sheeting is reduced. For instance, microspheres are typically embedded to a depth equivalent to between about 30 and 60 percent of their diameter. Furthermore, the binder material is thermoformed into adherent contact with the cover sheet to laminate the resultant retroreflective sheeting together, and therefore should preferably provide a strong bond to the inside surface of the cover sheet so as to provide high delamination resistance.

The binder material should be such as to not soften substantially under probable environmental conditions to which the sheeting will be subjected. For instance, a sheeting that is to be used as a traffic sign should comprise a binder material that will not soften substantially when exposed to harsh sunlight or under roadside conditions. Thus sheetings comprising binder materials having higher softening temperatures may be preferred for some environmental conditions. However, for convenient lamination of the base sheet to the cover sheet, the binder material should soften sufficiently to flow under pressure and heat around the retroreflective elements in the seal legs into contact with the inside surface of the cover sheet. Binder materials that soften sufficiently to flow under pressure at about 170° to 200° F. (75° to 95° C.) but which remain substantially firm, i.e., sufficiently dimensionally stable, to support the monolayer of microlenses in proper position, at temperatures below about 150° F. (65° C.) are typically useful for outdoor sign applications. Retroreflective sheetings comprising binder materials that soften sufficiently to flow under pressure only at higher temperatures typically tend to be more durable under ambient environmental conditions than sheetings comprising binder materials having lower softening temperatures; however, such binder materials tend to require more energy and higher lamination temperatures when forming retroreflective sheetings therefrom, and may even exceed the temperatures at which some cover films can be processed without degradation.

Alternatively, the binder material may be a material that is substantially thermoplastic to enable lamination of the cover sheet to the base sheet, but which can be cured or crosslinked as taught in U.S. Pat. No. 4,025,159 to achieve a stronger bond to the cover sheet. Such curing or crosslinking may also lessen the tendency of the binder layer to soften appreciably under ambient temperatures. It will typically be preferred that the binder material not be cured to such an extent that the resultant sheeting becomes substantially less flexible or even brittle.

The binder materials inherently of high whiteness, or more typically will contain a whitening agent such as a pigment. An exemplary pigment is titanium dioxide. The binder material may typically contain from about 10 to 70 weight percent titanium dioxide. Higher amounts of the pigment may enhance the whiteness and increase the opacity of the binder material, thereby increasing the effectiveness of the thin layers of binder material which cover the front surfaces of the retroreflective elements in the seal leg area, but may tend to thicken the binder material sufficiently to interfere with that material's ability to flow over and flood the front surfaces of the microspheres.

Referring again to FIG. 2, cover sheet 34 comprises inner layer 36, to inside surface 38 of which binder material 28 will be forced into adherent contact during the lamination process Cover sheet 34 also comprises, on outside major surface 39 of inner layer 36, at least one structural layer In some embodiments, cover sheet 34 will further comprise additional layers (not shown) on top side 42 of structural layer 40, or between inner layer 36 and structural layer 40; the latter, for example, includes primer layers.

A cellular retroreflective sheeting of the invention is provided by application of heat and pressure to cover sheet 34 and base sheet 20 such as disclosed in the aforementioned U.S. Pat. No. 3,190,178 (McKenzie).

The inner layer should be such as to not soften or adhere to the front surfaces of the microlenses under the conditions of lamination so as to interfere with the flow of the binder material around same in the seal leg area. For instance, the inner layer of the cover sheet preferably has a Vicat Softening Point of at least 175° F. (80° C.), more preferably at least 200° F. (95° C.), and most preferably at least 250° F. (120° C.). The Vicat Softening Point of a material may be determined according to ASTM D1525. Correspondingly, the inner layer will have a relatively higher hardness than the structural layer under the conditions of lamination.

The inner layer preferably has a Vicat Softening Point that is higher than that of the structural layer. Preferably the Vicat Softening Point of the inner layer is at least 15° F., and more preferably at least 35° F., higher than the Vicat Softening Point of the structural layer.

Depending upon the nature of the particular material comprised therein, the inner layer of the cover film may be between about 0.05 and 3 mils (1.3 and 75 microns) thick and will typically be less than 2 mils (50 microns) thick.

Contrary to its relative nature to the microlenses, to which it preferably does not adhere as described above, the inner layer of the cover film should be sufficiently compatible with the binder material such that a strong bond is provided on the seal legs to ensure that the resultant sheeting is delamination resistant. If desired, the inside surface of the inner layer of the cover sheet and/or the binder material may be primed to improve the adhesion therebetween. Examples of suitable primes include surface treatments such as corona treatment or plasma discharge, or application of polymeric priming layers. Such a layer, if applied to the inside surface of the cover sheet should be substantially transparent and should not be sufficiently soft or adherent to the microlenses under the lamination conditions to interfere with the enhanced whiteness which is provided by the present invention. Optional prime layer 38 on the inside surface of inner layer 36 of cover sheet 34 is shown in FIG. 2.

Examples of suitable materials for use in the inner layer include urethanes of suitable softening point such as films formed from NeoRez, a line of aqueous colloidal urethane dispersions, and certain acrylics such as films formed from NeoCryl, a line of acrylic emulsions, both available from Polyvinyl Chemical Industries. Other examples include certain polyolefin polymers having high Vicat Softening Points, as well as certain vinyls and polyesters having suitable Vicat Softening Points.

The cover sheet further comprises at least one structural layer that comprises, for instance, ethylene/acrylic acid copolymer, and imparts other desired properties to the cover sheet and to the resultant sheeting, e.g., flexibility, improved impact resistance, toughness, moisture impermeability, etc. The structural layer will typically be between about 1 and about 10 mils (25 to 250 microns) thick. The aforementioned U.S. Pat. No. 4,896,943 discusses several exemplary polyolefin-based cover film materials which may be used as structural layers of the cover sheet in the present invention, including: homopolymers such as polyethylene or polypropylene; copolymers comprising a major portion by weight of at least one of ethylene or propylene and a minor portion by weight of at least one comonomer, e.g., acrylic acid, methacrylic acid, vinyl acetate, or ethyl acrylate; or blends of these homopolymers or copolymers or blends of other polymers with such homopolymers or copolymers. Other examples of suitable materials for use in the main layer include urethanes and nylon.

The inner layer and structural layer of the cover sheet should be sufficiently compatible so as to provide a durable, preferably substantially inseparable, bond therebetween. Although the inner layer is typically adhered directly to the structural layer, another layer such as a primer layer may be disposed between them; in the latter case, the inner layer is still regarded as "adhered directly to the structural layer". Cover sheets may typically be formed by coextrusion of the inner and structural layers, by lamination of preformed layers together, or by application, eg., coating or spraying, of one of such layers on a previously formed counterpart. Coextrusion is typically preferred because of possible cost savings made possible by a one step process and because it typically provides the most inseparable bond between the inner layer and structural layer of the cover sheet. Examples of such cover sheets include those having an inner layer comprising polyethylene, polypropylene, and polymethylpentene and a structural layer comprising ethylene/acrylic acid copolymer. Preferred polyethylene inner layers have low density (i.e., about 0.91 to 0.94) as such polyethylenes typically have higher clarity than do relatively higher density polyethylenes. Preferred polypropylenes may have Vicat Softening Points between about 280° and 340° F. (140° and 170° C.)

The structural layer need not make up a majority of the thickness of the cover sheet, but generally makes up at least one third the thickness thereof, and typically, structural layer makes up from about 50 and to 95 percent or more of the total thickness of the cover sheet. Cover sheets disclosed herein will typically be between about 1 mil and 10 mils (25 to 250 microns) thick, and more typically will be between 2 and 4 mils (50 to 200 microns) thick.

The cover sheet should be substantially transparent so as not to interfere with the retroreflective efficiency of the retroreflective elements. Preferably, the cover sheet has a transmittance of visible light of at least 75, and most preferably at least 85 percent, as measured by ASTM D1003. Typically the cover sheet will also be substantially colorless.

If desired the cover sheet may be colored such as with a dye to provide a retroreflective sheeting of desired color. Such dye may be incorporated in the inner layer or structural layer of the cover sheet, or in an additional layer which is incorporated in the cover sheet for this purpose. The effects provided by this invention which impart high whiteness to retroreflective sheetings having substantially colorless cover sheets will impart truer, brighter colors to retroreflective sheetings having colored cover sheets.

When retroreflective sheetings are formed with cover sheets as described herein by lamination processes employing heat and pressure such as described above, it has been observed that the sheetings have a whiter overall appearance, particularly the seal legs thereof wherein the binder material was observed to more completely swallow or flood the front surfaces of the microspheres. This perceived enhanced whiteness has been confirmed in the form of measurably higher CAP Y values in sheetings comprising a cover film having an inner layer such as taught herein than the CAP Y values of similarly formed sheetings comprising cover sheets that were otherwise identical except they did not comprise such an inner layer. Retroreflective sheetings of the invention have been made which have CAP Y values of at least 27 and even 30, at typical seal leg widths of about 20 mils (0.5 millimeter), which seal legs in some instances constitute between 20 and 30 percent of the total surface area of the sheeting. Wider seal legs could be formed to further enhance whiteness of the retroreflective sheeting, but tend to result in reduced retroreflective brightness.

While we do not wish to be bound to a particular theory or theories for this advantageous phenomenon, it is believed that the enhanced whiteness which is achieved herein may be the result of the manner in which the inside surface of the inner layer of the cover sheet, the front surfaces of the microlenses, and the binder material interact during the lamination process. One theory is that, because the Vicat Softening Point of the inner layer is sufficiently high, the inner layer resists penetration by the microlenses during lamination such that the inner layer is not deformed or, if deformed, only a broad depression or "dimple" is formed in the inside surface thereof, rather than a narrower more cup-like depression that conforms closely to the contour of the front surfaces of the microlenses. A second theory is that the inside surface of the inner layer of the cover sheet substantially does not adhere to the front surfaces of the microlenses under the conditions of lamination. Alternatively, a combination of both of these actions may occur, or still another mechanism may occur, such that the binder material is better able to flow around and flood the front surfaces of the microlenses in the seal legs.

Figure 3:
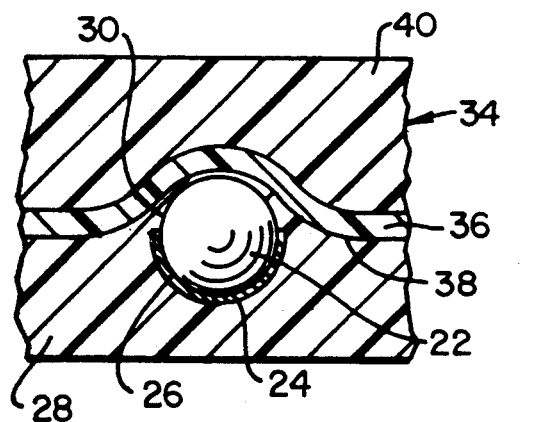
FIG. 3 is a cross-sectional view of a portion of a seal leg of a cellular retroreflective sheeting of an embodiment of the invention, illustrating the relative positions understood to exist for a single retroreflective element, binder material, and cover sheet in sheeting of the invention.
Figure 4:
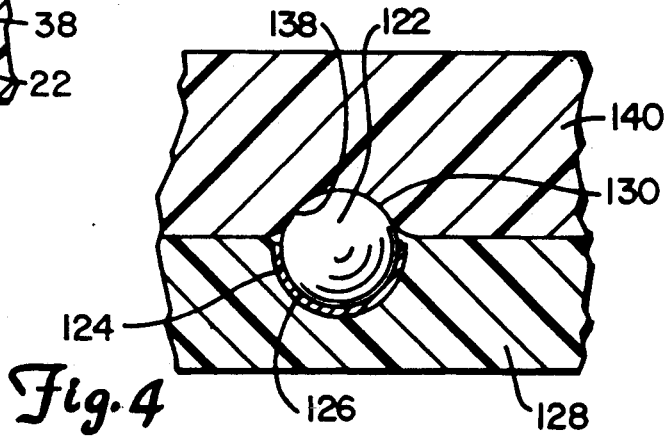
FIG. 4 is a cross-sectional view of a portion of a seal leg of a cellular retroreflective sheeting of the prior art wherein the cover sheet comprises a soft material, illustrating the relative positions understood to exist for a single retroreflective element, binder material, and cover sheet in that prior art sheeting.

The postulated mechanisms may be further understood with reference to FIGS. 3 and 4. FIG. 3 is a cross-sectional view of a portion of a seal leg of a cellular, retroreflective sheeting of the invention, and is believed to represent the relative position of a single retroreflective element such as microsphere 22, having specularly reflecting layer 24 on the rear surface 26 thereof, with respect to cover sheet 34, which comprises inner layer 36 and structural layer 40. During lamination of the base sheet and cover sheet together, microsphere 22 has penetrated cover sheet 34 forming a broad depression as shown in inside surface 38 of inner layer 36. Binder material 28 has been effectively forced around microsphere 22, substantially flooding the front surface 30 of microsphere 22, into contact with inner layer 36. Thus, when the seal legs of the resultant retroreflective sheeting are viewed from the top or front surface of the sheeting, the whitened binder material effectively hides microsphere 22 and underlying gray specularly reflecting layer 24, thereby imparting a whiter overall appearance to the sheeting.

In FIG. 4 is shown a cross-sectional view that is believed to represent a portion of a seal leg of a cellular retroreflective sheeting of the prior art wherein the cover sheet comprises a soft layer, like that used as the structural layer in a cover sheet of retroreflective sheeting of the invention, but no inner layer as taught by the present invention. In that Figure is shown a single retroreflective element 122 having specularly reflecting layer 124 on the rear surface 126 thereof. Cover sheet 140 comprises a layer of material such as may be used in structural layer 40 shown in FIG. 3. During lamination of the base sheet and cover sheet together, microsphere 122 has penetrated inside surface 138 of cover sheet 140. Because of the nature of cover sheet 140, the depression formed therein is narrow and cup-like and tends to conform to the front surface 130 of microsphere 122 such that binder material 128 has not effectively flooded the front surface 130 of microsphere 122. Thus, when viewed from the top or front of the resultant sheeting, the specularly reflecting layer 124 behind microsphere 122 will be visible, thereby causing the seal legs of the resultant sheeting to be substantially gray in appearance.

The following test methods were used to evaluate the sheetings described in the following examples.

Vicat Softening Point

The Vicat Softening Point of the indicated materials was determined according to ASTM D1525.

Hardness

The hardness of the indicated materials was determined according to ASTM D2240, except measurements were taken at different temperatures as indicated.

Microsphere Adhesion

This test measures the adhesion of common retroreflective elements such as microspheres to materials that may be used in the cover sheet so as to provide the inside surface of the cover sheet, i.e., the surface to which the binder material is thermoformed and to which the retroreflective elements are pushed into contact during lamination. Microsphere adhesion is determined by separately heating a quantity of microspheres of the type used in retroreflective sheetings (including any surface treatments used therein) for one hour, and a film of the material to be tested held on a polyethylene terephthalate carrier, for two minutes, at 220° F. (105° C.). The temperature to which the microspheres and film are heated is selected to approximate the temperature that the inside surface of the cover film is expected to achieve during lamination or sealing of the base sheet to the cover sheet. Temperatures to test microsphere adhesion for cover sheet materials that are to be sealed at higher temperatures would be selected accordingly. The hot microspheres are then flooded across the hot sample (while still in the oven) to a depth of about 0.1 inch (0.3 centimeter) and the test panel left in the oven for five minutes. After heating, the test panel is removed from the oven, allowed to cool for one minute, and then shaken vigorously. The percentage of microspheres remaining after such action is estimated, and the panel then rubbed lightly and the percentage of the microspheres still remaining after that action estimated. Relatively greater microsphere adhesion is indicated by larger percentages of microspheres remaining on the panel.

Brightness

The brightness of the indicated sheetings were measured with a retroluminometer as described in U.S. Defensive Publication T987,003 at a divergence angle of 0.2° and an entrance angle of −4.0°.

CAP Y

CAP Y is a colormetric measurement of sheeting whiteness. The CAP Y values discussed herein were determined with a Hunter Spectrophotometer according to ASTM E97-77.

Seal Strength

The seal strength of an encapsulated sheeting is determined as follows. A 1 inch (2.5 centimeter) wide strip of the sheeting is adhered to a rigid aluminum panel with a layer of adhesive applied to the back, i.e., nonreflective, side of the sheeting. A 1 inch (2.5 centimeter) wide strip of tape is applied to the cover sheet of the sample sheeting and a razor blade used to separate one end of the cover Sheet from the base sheet. The 90° peel force required to delaminate the cover sheet from the base sheet is then determined with an Instron.

EXAMPLE 1

A polyethylene-coated paper carrier was heated to about 105° C. and then flooded with glass microspheres having an average diameter of about 65 microns and a refractive index of about 1.91. The excess beads were removed from the surface of the carrier yielding substantially a monolayer of microspheres thereon, and the carrier and monolayer then heated to about 140° C. to soften the polyethylene coating such that the microspheres were embedded therein to a depth of about 30 percent of their diameter by gravity and capillary forces. The carrier and monolayer were then put into a vacuum chamber and a layer of aluminum deposited thereon to a thickness of about 100 nanometers.

A binder material comprising 82 parts of a thermoplastic aliphatic urethane binder (Q-THANE P3429, available from K. J. Quinn and Co., Inc., and believed to comprise the reaction product of 1,1-methylene bis(4-isocyanato-cyclohexane), adipic acid, isophthalic acid, and 1,4-butane diol) 18 parts of rutile titanium dioxide was dried in a dehumidification drier at 66° C. for 16 hours and then extruded onto the polyethylene side of a duplex carrier comprising a 12.5 micron layer of low-density polyethylene and a 12.5 micron layer of polyester. Extrusion conditions were as follows: 171° C., 193° C., 210° C., and 216° C. The extrusion die end plates were set at 204° C. and the body of the die at 193° C. Extrusion screw speed and film take-away speed were adjusted to provide a binder film of about 50 microns thickness.

The aluminum-coated side of the monolayer of microspheres was contacted to [he binder film, and the microspheres and aluminum coating transferred thereto. The transfer conditions included a hot can temperature of 110° C., an applied pressure of 25.2 kilograms/centimeter width, and a line speed of 32 meters/minute. These conditions embed the microspheres to about 20 percent of their diameter in the binder material. The polyethylene-coated paper carrier can then be stripped from the microspheres which remain in the binder film.

Visual examination with a microscope of the carrier revealed that essentially all of the microspheres had been transferred to the binder film, and that essentially all of the aluminum vapor coat that had been deposited on the carrier between individual microspheres remained on the carrier without transfer to the binder film.

A transparent film comprising 97.4 parts of PRIMACOR 3440 (an extrusion grade, thermoplastic, high molecular weight copolymer believed to comprise a major portion of ethylene monomer and a minor portion of acrylic acid monomer, available from DuPont, having a melt flow index of about 10), and 2.6 parts of a weather stabilizing system (1.0 part of ultraviolet absorber, 1.5 parts of a hindered amine, and 0.1 parts of an antioxidant; which is not believed to affect the strength of the film or its adhesion to other materials), was extruded as follows to form a structural layer. The stabilized copolymer was extruded from a 6.3 centimeter extruder through a 40.6 centimeter die onto a biaxially-oriented polyethylene terephthalate (PET) carrier using a single-flighted screw with a compression ratio of 3:1. The extruder temperatures were 190° C., 260° C., 273° C., 264° C., and 264° C. for zones 1 through 5, respectively. The extruder neck and die lips were at 270° C.. The extruder screw speed was 30 rpm while the film take-away speed was adjusted to provide a film having a thickness of about 100 microns. The extruded film was then wound upon itself into roll form.

An inner layer was formed on one side of the structural layer by gravure coating a solution comprising Co., believed to comprise water-borne aliphatic urethane), 14.9 parts water, 0.2 part Witco 3056A bubble breaker, 7.5 parts ethyl alcohol, 0.1 part of a fluorocarbon leveling agent, and 2.3 parts CX-100 (100 percent active polyfunctional aziridine liquid crosslinker from Polyvinyl Chemicals Co.) thereon using a 78 line trihelical gravure cylinder. The coating was then dried for about 10 minutes at room temperature and cured for 1 minute at about 130° C. to yield a cover sheet having a 6.0 micron thick inner layer.

The cover sheet was contacted to the base sheet such that the inside surface of the inner layer was in contact with the microspheres protruding from the base sheet, and sealed thereto along a network of interconnecting bonds under the following conditions:
Embossing can temperature—360° F. (180° C.)
Binder preheat temperature—300° F. (150° C.)
Embossing can speed—19 feet/minute (5.8 meters/minute)
Nip roll pressure—60 pounds/inch-width (52 kilogram/centimeterwidth).

After removal of the PET and duplex carriers, the properties of the resultant retroreflective sheeting were determined as tabulated in Table 1 below. pounds/inch-width

COMPARATIVE EXAMPLE A

A retroreflective sheeting was made as in Example 1 except the transparent film used as the structural layer of the cover sheet in that Example was sealed directly to the base sheet without an inner layer at an embossing speed of about 19 feet/minute (5.8 meters/minute).

After removal of the PET and duplex carriers, the seal legs of the resultant sheeting were found to be about 40 mils wide, i.e., about twice as wide as those of the cellular sheeting formed in Example 1. The increased width of the seal legs was believed to be the result of softening and loss of dimensional stability by the cover sheet during sealing, thus indicating a further advantage of the invention wherein the inner layer may impart greater dimensional stability to the cover sheet such that the base sheet and cover sheet may be subjected to heat and pressure for longer periods, which in some instances may result in increased seal strengths and more delamination-resistant retroreflective sheeting.

The properties of the resultant sheeting are tabulated in Table 1.

COMPARATIVE EXAMPLE B

A retroreflective sheeting was made as in Comparative Example A except the cover sheet was sealed to the base sheet at an embossing speed of about 64 feet/minute (19.5 meters/minute) to produce seal legs having substantially the same width as in Example 1.

The properties of the resultant retroreflective sheeting are also tabulated in Table 1.

EXAMPLE 2

A retroreflective sheeting was prepared as in Example 1 except the inner layer was a 1 mil (25 microns) thick vinyl layer of vinyl chloride/vinyl acetate. The inner layer was formed from a solution comprising 30 percent by weight solids of 97 parts VMCH, a vinyl chloride/vinyl acetate resin, available from Union Carbide, and 3 parts CX-100, in a 50/50 weight ratio solution of methyl ethyl ketone and xylol which was coated onto the structural layer with a knife coater, dried at room temperature for 5 minutes and at 175° F. for 10 minutes.

The cover sheet and base sheet were sealed under the same conditions as in Example 1, except at an embossing speed of about 8 feet/minute (2.4 meters/minute) to produce seal legs of substantially the same width as in Example 1.

The properties of the resultant retroreflective sheeting are also tabulated in Table 1.

EXAMPLE 3

A monolayer of microspheres was formed on a polyethylene-coated paper carrier as in Example 1.

Onto a 20 micrometer thick polyethylene terephthalate support film was extruded a binder film comprising 69.0 parts of a ethylene/methacrylic acid (EMAA) copolymer, 31.0 parts of a concentrate consisting of 11.9 parts of a ethylene/vinyl acetate (EVA) copolymer, 18.0 parts of rutile titanium dioxide white pigment, and 1.1 parts of a weathering stabilizer system consisting of 1.0 part of a hindered amine light stabilizer and 0.1 part of antioxidant. The EMAA copolymer, ELVAX II 5720, available from DuPont, had a melt flow index of 100 and was understood to be a copolymer of 89 parts ethylene and 11 parts methacrylic acid. The EVA copolymer, ELVAX 230, also available from DuPont, had a melt flow index of 110 and was understood to be a copolymer of 72.0 parts ethylene and 28 parts vinyl acetate. The extruder had a diameter of 4.4 centimeters and a length/diameter ratio of 30:1. The extruder temperature profile (from hopper end to die) was set at 77° C., 204° C., 149° C., and 132° C., respectively. The polymer transfer tube was set at 132° C., while the film die was set at 143° C. Extruder screw speed was adjusted to 26 rpm while the film takeaway speed was adjusted to 12.2 meters/minute to provide a binder film thickness of about 50 micrometers.

The aluminum-coated side of the monolayer of microspheres on the polyethylene-paper carrier was contacted to the binder film while the hot can was at 104° C. and the applied pressure was 31.6 kilograms/centimeterwidth at a line speed of 6 meters/minute. This pressed the microspheres into the binder film to a depth of approximately 20 percent of their diameter. After peeling off the carrier, the remaining laminate or base sheet was rolled upon itself for storage. Examination under a microscope of the stripped carrier and base sheet showed that about 99 percent of the microspheres had transferred to the binder film while nearly 100 percent of the aluminum vapor coat between the microspheres remained behind on the carrier.

Onto a 4 mil thick (100 micron) EAA structural layer as described in Example 1 was extruded an inner layer comprising a 0.2 mil (5 micron) thick layer of homopolymer polyethylene to produce the cover sheet of the invention. The homopolymer polyethylene, NPE 3011 available from the ENRON Chemical Co., had a melt index of 5.0 and is believed to be a low density resin as indicated by a density of 0.924 gram/cubic centimeter.

The cover sheet was laminated to the base sheet described above under the following conditions:
Embossing can temperature—360° F. (180° C.)
Binder preheat temperature—210° F. (100° C.)
Embossing speed—51 feet/minute (15.5 meters/minute)
Nip roll pressure—60 pounds/inch-width (69 Kilograms/centimeter-width)
to produce seal legs of substantially the same width as in Example 1.

The properties of the resultant retroreflective sheeting are tabulated in Table 1.

COMPARATIVE EXAMPLE C

A retroreflective sheeting was made as in Example 3 except the transparent film used as the structural layer of the cover sheet in that Example was sealed directly to the base sheet without an inner layer at an embossing can speed of about 46 feet/minute (14 meters/minute) to produce seal legs of substantially the same width as in Example 1.

The properties of the resultant retroreflective sheeting are also tabulated in Table 1.

TABLE 1

| Example | Structural Layer | Inner Layer | Seal Leg Width (mils) | Seal Strength (pounds/inch-width) | Brightness (candela/lux/square meter) | Vicat Softening Point[1] (°C.) | Microsphere Adhesion | CAP Y |
|---|---|---|---|---|---|---|---|---|
| 1 | EAA | NeoRez | 20 | 3.0 | 215 | 135 | N[2] | 28.8 |
| 2 | EAA | VMCH | 20 | 4.5 | 205 | 110 | N[2] | 27.4 |
| 3 | EAA | Polyetheylene | 20 | 2.5 | 200 | 96 | N[2] | 28.2 |
| A | EAA | — | 40 | 1.0 | 155 | 73 | S[3] | 29.0 |
| B | EAA | — | 21 | 0.8 | 170 | 73 | S[3] | 25.6 |
| C | EAA | — | 20 | 3.0 | 205 | 73 | S[3] | 24.2 |

[1] Of the layer of cover sheet that contacts the microspheres.
[2] Negligible
[3] Substantial Various modifications and alterations of this invention will become apparent to those skilled in the art without departing from the scope and spirit of this invention.

What is claimed is:

1. A cellular, encapsulated-lens retroreflective sheeting comprising: (1) a base sheet that comprises a monolayer of retroreflective elements partially embedded in a binder layer; (2) a cover sheet disposed in spaced relation from the layer of retroreflective elements; and (3) a network of narrow intersecting bonds that extend between said cover sheet and said base sheet and comprise binder material thermoformed at the point of contact between said bonds and said cover sheet so as to adhere said base sheet and said cover sheet together and from a plurality of cells within which retroreflective elements are hermetically sealed;

wherein the cover sheet comprises an inner layer and at least a structural layer, said inner layer having an inside major surface that is in adherent contact with said intersecting bonds, and an outside major surface adhered to said structural layer of said cover sheet, and said inner layer having a Vicat Softening point of at least said structural layer of said cover sheet, said Vicat Softening Point of said inner layer also being higher than the minimum temperature at which said binder material was thermoformable into contact with said cover sheet, such that said inner layer improved the interaction between said cover sheet and said retroreflective elements so that when said binder material was thermoformed into contact with said cover sheet the flow of said binder material around the front surfaces of said retroreflective elements was improved.

2. The sheeting of claim 1 wherein said Vicat Softening Point of said inner layer is at least 175° F.

3. The sheeting of claim 1 wherein said Vicat Softening Point of said inner layer is at least 200° F.

4. The sheeting of claim 1 wherein said Vicat Softening Point of said inner layer is at least 250° F.

5. The sheeting of claim 1 wherein said Vicat Softening Point of said inner layer is at least 15° F. higher than said Vicat Softening Point of said structural layer.

6. The sheeting of claim 1 wherein said Vicat Softening Point of said inner layer is at least 35° F. higher than said Vicat Softening Point of said structural layer.

7. The sheeting of claim 1 wherein said inner layer has a lower adhesion to glass than the adhesion to glass of said structural layer.

8. The sheeting of claim 1 wherein said retroreflective elements are microspheres and said sheeting further comprises a specularly reflecting layer underlying said microspheres.

9. The sheeting of claim 1 wherein said inner layer is colored.

10. The sheeting of claim 1 wherein said structural layer is colored.

11. The sheeting of claim 1 wherein said retroreflective elements comprise glass.

12. The sheeting of claim 1 wherein said binder layer comprises a whitening agent.

13. The sheeting of claim 12 wherein said whitening agent comprises a pigment.

14. The sheeting of claim 13 wherein said pigment comprises titanium dioxide.

15. The sheeting of claim 1 wherein said inside major surface of said inner layer is primed to improve the adhesion of said binder material thereto.

16. The sheeting of claim 1 wherein said sheeting has an overall CAP Y of at least 27.

17. The sheeting of claim 16 wherein said seal legs constitute between about 20 and 30 percent of the total surface area of said sheeting.

18. The sheeting of claim 1 wherein said inner layer of said cover sheet has a thickness of between about 0.05 mil and 3 mils.

19. The sheeting of claim 1 wherein said inner layer of said cover sheet has a thickness of less than about 2 mils.

20. The sheeting of claim 1 wherein said cover sheet has a total thickness of between about 1 mil and 10 mils.

21. The sheeting of claim 1 wherein said cover sheet has a total thickness of between about 2 and 4 mils.

22. The sheeting of claim 1 wherein said structural layer constitutes at least 50 percent of the thickness of said cover sheet.

23. The sheeting of claim 1 wherein said cover sheet has a transmittance to visible light of at least 75 percent.

24. The sheeting of claim 1 wherein said cover sheet has a transmittance to visible light of at least 85 percent.

25. The sheeting of claim 1 wherein said structural layer comprises: polyethylene, or polypropylene; or a copolymer comprising a major portion by weight of at least one of ethylene or propylene and a minor portion by weight of at least one comonomer; or a blend thereof.

26. The sheeting of claim 25 wherein said inner layer comprises a urethane.

27. The sheeting of claim 26 wherein said inner layer has a Vicat Softening Point of at least 175° F.

28. The sheeting of claim 1 wherein said inner layer and said structural layer have been coextruded.

29. A cellular, encapsulated-lens retroreflective sheeting comprising: (1) a base sheet that comprises a monolayer of retroreflective elements partially embedded in a binder layer; (2) a cover sheet disposed in spaced relation from the layer of retroflective elements; and (3) a network of narrow intersecting bonds that extend between said cover sheet and said base sheet and comprise binder material thermoformed at the point of contact between said bonds and said cover sheet so as to adhere said base sheet and said cover sheet together and form a plurality of cells within which retroreflective elements are hermetically sealed;

wherein the cover sheet comprises an inner layer and at least a structural layer, said inner layer having an inside major surface that is in adherent contact with said intersecting bonds, and an outside major surface adhered to said structural layer of said cover sheet, and said inner layer having a lower adhesion to glass than the adhesion to glass of said structural layer, such that said inner layer improved the interaction between said cover sheet and said retroreflective elements so that when said binder material was thermoformed into contact with said cover sheet the flow of said binder material around the front surfaces of said retroreflective elements was improved.

* * * * *

UNITED STATES PATENT AND TRADEMARK OFFICE
CERTIFICATE OF CORRECTION

PATENT NO. : 5,066,098

DATED : November 19, 1991

INVENTOR(S) : Roger R. Kult et al.

It is certified that error appears in the above-identified patent and that said Letters Patent is hereby corrected as shown below:

In Column 3, Lines 37-38, the word "retains" should read --remains--.

In Column 6, Line 42, insert a period after the word "process".

In Column 6, Line 44, insert --40.-- after the word "layer".

In Column 7, Line 24, the number "38" should read --37--, and delete the word "the".

In Column 7, Line 25, insert the number --38-- between the words "surface" and "of".

In Column 11, Line 27, the word "[he" should read --the--.

In Column 11, Line 67, after the word "comprising" insert --75.0 parts NeoRez R960 (available from Polyvinyl Chemicals--.

In Column 12, Lines 23-24, delete the words "pounds/inch-width".

In Column 13, Line 46, "132°C" should read --121°C--.

In Column 14, Line 57, the word "from" should read --form--.

UNITED STATES PATENT AND TRADEMARK OFFICE
CERTIFICATE OF CORRECTION

PATENT NO. : 5,066,098

DATED : November 19, 1991

INVENTOR(S) : Roger R. Kult et al

It is certified that error appears in the above-identified patent and that said Letters Patent is hereby corrected as shown below:

In Column 14, Lines 66-67, the word "point" should be capitalized. After the word "point", insert --that is higher than the Vicat Softening Point--.

Signed and Sealed this

Twenty-fifth Day of May, 1993

Attest:

MICHAEL K. KIRK

Attesting Officer

Acting Commissioner of Patents and Trademarks